United States Patent
Buge et al.

(10) Patent No.: US 6,820,337 B2
(45) Date of Patent: Nov. 23, 2004

(54) PROCESS FOR MAKING A PANEL WITH A PROTECTED ACOUSTIC DAMPING LAYER AND ACOUSTIC PANEL AS MADE

(75) Inventors: Michel Buge, Saint Sebastien sur Loire (FR); Alain Porte, Colomiers (FR); Jean-Marc Poignonec, Saint Etienne de Montluc (FR)

(73) Assignee: Airbus France, Toulouse Cedex (FR)

( * ) Notice: Subject to any disclaimer, the term of this patent is extended or adjusted under 35 U.S.C. 154(b) by 21 days.

(21) Appl. No.: 10/023,771

(22) Filed: Dec. 21, 2001

(65) Prior Publication Data

US 2002/0078569 A1 Jun. 27, 2002

(30) Foreign Application Priority Data

Dec. 21, 2000 (FR) .............................................. 00 16843

(51) Int. Cl.⁷ ................................................. B23P 15/00
(52) U.S. Cl. ...................... 29/897.32; 29/897; 29/897.3
(58) Field of Search .......................... 29/890.01, 897.32, 29/458, 469; 428/116, 118; 181/210, 290

(56) References Cited

U.S. PATENT DOCUMENTS

| | | | |
|---|---|---|---|
| 1,490,923 A | * 4/1924 | Marshall | 222/168.5 |
| 4,038,118 A | 7/1977 | James | |
| 5,754,491 A | * 5/1998 | Cushman | 367/1 |
| 5,806,796 A | * 9/1998 | Healey | 244/117 R |
| 6,268,038 B1 | 7/2001 | Porte et al. | |
| 2002/0125067 A1 | * 9/2002 | Porte et al. | 181/210 |
| 2003/0042657 A1 | * 3/2003 | Dublineau et al. | 264/400 |

FOREIGN PATENT DOCUMENTS

| | | |
|---|---|---|
| FR | 2 767 411 | 2/1999 |
| GB | 1 490 923 | 11/1977 |
| WO | 92/20523 | 11/1992 |

* cited by examiner

*Primary Examiner*—Irene Rosenbaum
(74) *Attorney, Agent, or Firm*—Young & Thompson

(57) ABSTRACT

A process for the production of a panel with a protective acoustic damping layer. The protective layer includes at least one porous core covered, on the one side, with a porous acoustic damping layer and on the other side with an acoustic reflector. The porous damping layer is emplaced by striping or draping. The porous damping layer consists of parallel strips. Edges of the strips of the porous damping layer are positioned facing a strip deposited by striping or draping and containing a thermoplastic, thermosetting or thermofusible material adapted, by subsequent heating, to ensure the securement of the edges of said strips of the porous damping layer with the adjacent strip of thermoplastic, thermosetting or thermofusible material.

17 Claims, 5 Drawing Sheets

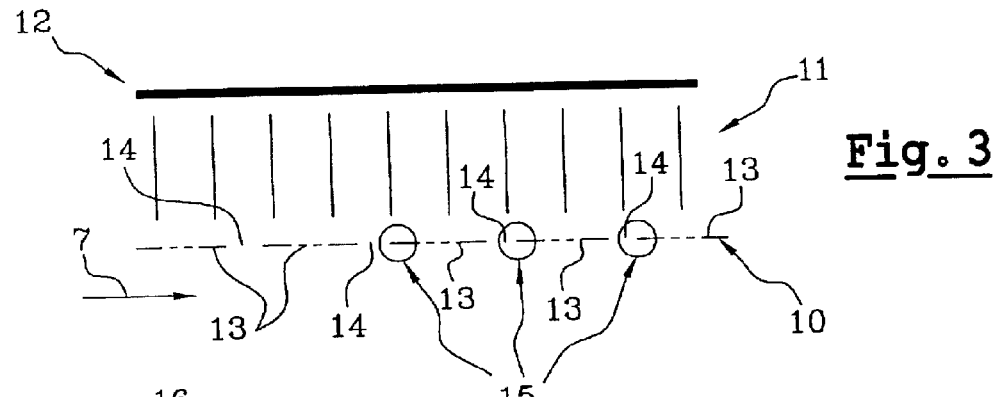
Fig. 3
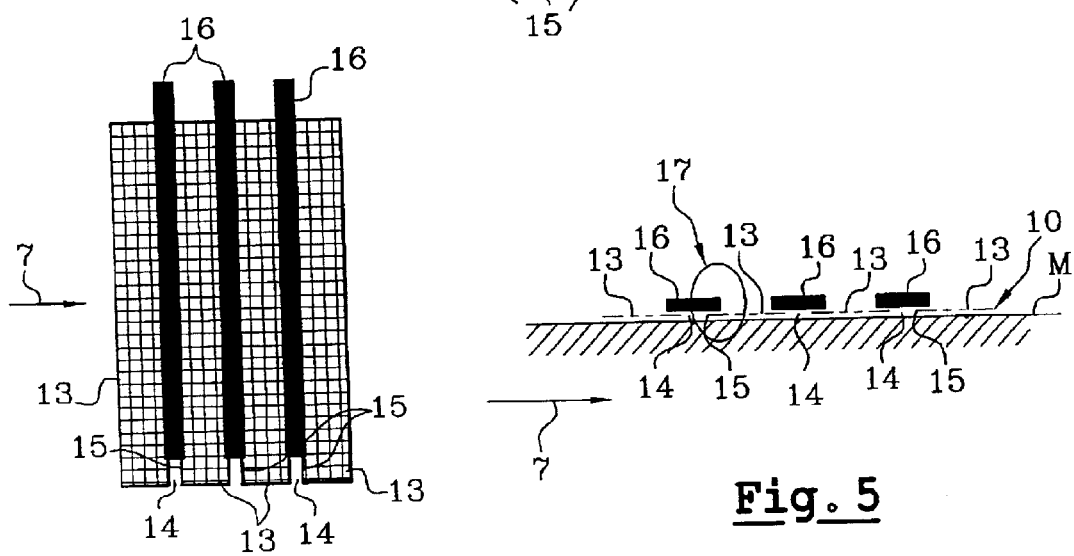
Fig. 4
Fig. 5
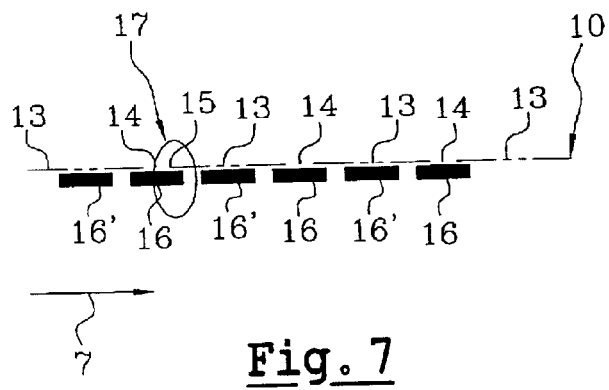
Fig. 7
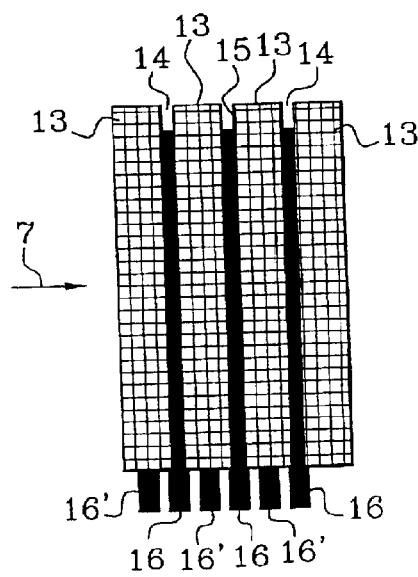
Fig. 6

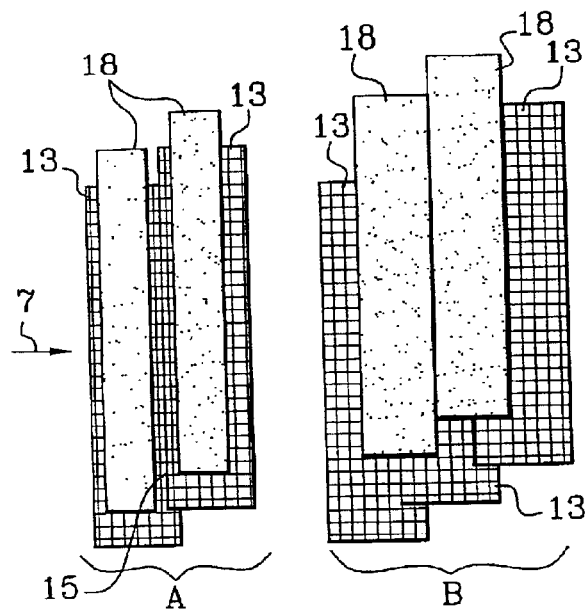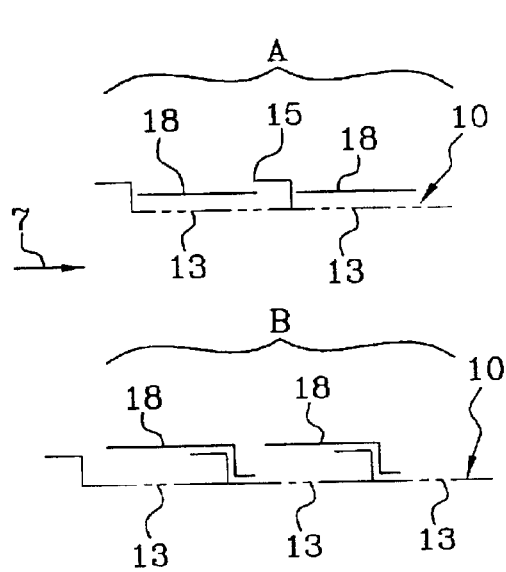
Fig. 16  Fig. 17
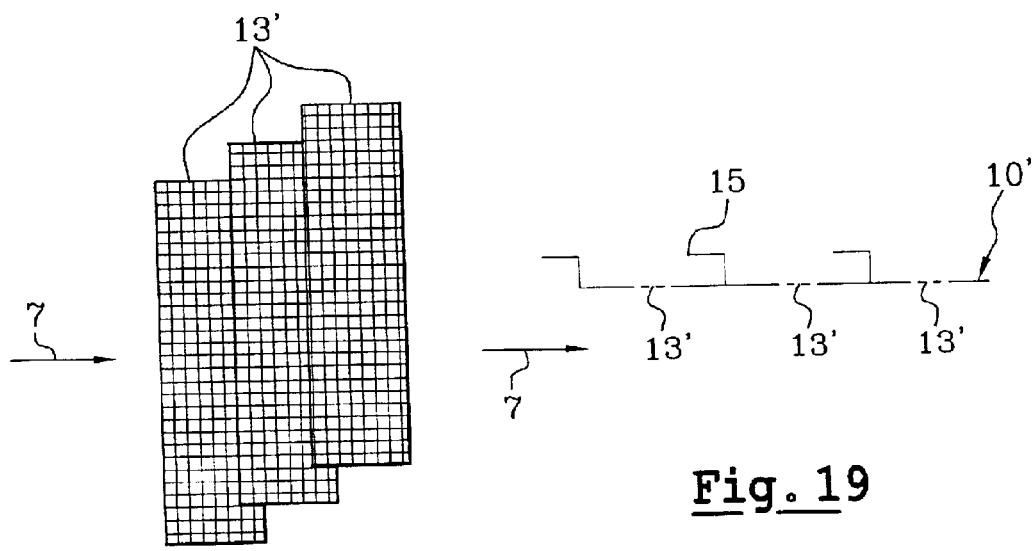
Fig. 18  Fig. 19

PROCESS FOR MAKING A PANEL WITH A PROTECTED ACOUSTIC DAMPING LAYER AND ACOUSTIC PANEL AS MADE

BACKGROUND OF THE INVENTION

The present invention relates to panels with acoustic attenuation and more particularly to those lining the annular fan channels formed in the nacelles of turbo motors, particularly of aircraft.

Such panels form the envelope, on the fan channel side, of the nacelle, behind the air inlet lip and have a structure adapted to attenuate the noise produced by the central portion of the motor surrounded by the nacelle and particularly the noise produced by the fan.

In practice, these panels include a porous core such as a honeycomb structure covered, on the fan channel side, with an acoustic damping layer and, on the opposite side, a rear reflector.

The acoustic damping layer is a porous structure with the role of dissipating, which is to say partially transforming, the acoustic energy of the sound wave passing through it, into heat.

This porous structure can be, for example, a metallic cloth or a cloth of carbon fibers whose weave permits fulfilling its dissipating function.

These acoustic panels must also have sufficient structural properties particularly to receive and transfer aerodynamic and inertial forces and forces connected with supporting the nacelle, toward the nacelle/motor structural connections, and so it is necessary to impart structural properties to the acoustic damping layer.

To this end, there can, as shown in British patent 2 130 963, provide an acoustic damping layer with two components, namely a structural layer, on the honeycomb side and a porous surface layer, or else use as the damping layer a cloth combining both the acoustic function and the structural function by selecting a diameter of the filaments of the cloth giving to this latter a high resistance to forces coupled with good acoustic damping.

For making such panels, there is known the process consisting in producing the annular assembly forming the wall of the fan channel in two interfitting half channels comprising, for each half panel, the following steps:

predeforming a layer of porous structure on a form identical to a half panel, with the help of jaws stretching the porous material to its elastic limit, acoustically measuring the shape thus produced so as to qualify the mean value of the acoustic porosity, adapting to the mean value above, the spacing of winding of the carbon filaments adapted to be deposited on the porous layer to constitute a structural layer, emplacing on a suitable mold the predeformed shape, then making the half panel by known techniques of winding said carbon fibers, and emplacing the porous core and the rear reflector.

This process has drawbacks.

Thus, the shape to be produced not being a figure of revolution, there exists in the deformed layer inhomogeneous regions, which is to say regions stretched and regions stressed, which degrade the general acoustic quality of the porous structure. The interval of winding the carbon fibers being adapted to the mean value of acoustic porosity of the structure, the inhomogeneous regions introduce variations in the acoustic attenuation of the noise generated by the motor.

Moreover, the presence of interfitting connections of the two half panels introduces two regions of acoustic refraction in the final acoustic panel, which is prejudicial to the quality of damping the noises generated by the motor.

To overcome these drawbacks, there can, as taught by French patent 2 767 411 in the name of the applicant, be emplaced an acoustic damping layer by winding with a porous material present in the form of strip.

This manner of proceeding not only permits avoiding inhomogeneous regions of the porous layer from an acoustical standpoint, as indicated above, in the conventional manner of fabricating the two half panels, but also eliminates the necessity of interfitting, the winding of the porous layer being adapted to form other layers, namely the structural layer, the porous central core, the rear reflector, so as to produce a complete acoustic panel in a single piece, without interfitting.

The absence of interfitting permits increasing the effective acoustic surface of the panel, of decreasing its weight and reducing the time and cost of production.

However, an acoustic panel of such a structure uses constituent strips of the porous layer in direct contact with the flow of aerodynamic fluid in the fan channel. When these strips are made of metallic cloth, they are easily peeled back at their edge in contact with the aerodynamic flow, the more so as they are disposed substantially perpendicular to the direction of said flow.

Thus, not only the acoustic qualities of the panel are degraded, but moreover, the panel itself is degraded and must be changed, which gives rise to maintenance and down time costs of the aircraft.

The present invention has for its object to overcome these drawbacks by improving the winding technique described in FR 2 767 411.

SUMMARY OF THE INVENTION

To this end, the invention has for its object a process for the production of a panel with a protected acoustic damping layer, comprising at least one central core with a porous structure covered, on the one hand, with a porous acoustic damping layer and, on the other hand, a totally acoustic reflector, in which at least said porous layer is emplaced by winding or draping, said porous layer being constituted by parallel strips, characterized in that the edges of the strips of the porous layer are positioned facing a strip deposited by winding or draping and containing a thermoplastic, thermohardenable or thermofusible material adapted, by ultimate heating, to ensure the soliderization of the edges of said strips with the adjacent strip.

According to a way of proceeding adapted more particularly to the production of a panel in a single piece, without interlocking, of generally annular shape, the porous layer and said strip containing a thermoplastic, thermohardening or thermosfusible material, are wound or draped on a mold having the shape of the panel to be produced, the porous structure and the total reflector being then emplaced also by winding or draping.

Other panels, convex or concave, or non-annular, can be produced according to the process of the invention and preferably simultaneously from a same mold on which are wound or draped the various layers constituting the panels.

According to the order of laying down the different layers on the mold, there will be obtained a panel with a concave or convex porous layer.

There can thus be produced for example panels constituting pressure reversing doors or panels with interconnections for a nacelle.

According to one embodiment of the process, said strip containing a thermoplastic, thermohardening or thermofusible material is constituted of filaments pre-impregnated with a thermohardening or thermoplastic resin, said strip constituting a structural layer associated with the porous acoustic layer and adapted, which is the case for use of the process of the invention for the production of air inlet acoustic panels for a nacelle, to transfer the dynamic and inertial forces as well as those connected with the support of the nacelle, toward the structural connections.

By filaments, there is meant an assembly of square, round or rectangular cross-section filaments, of strips of filaments, of meshes, of bundles or layers of filaments, of different nature, for example of carbon, glass or "Kevlar".

These filaments in the general sense defined above are deposited for example by winding in various ways and are used essentially in the case of a non-joined deposition of the windings of the porous acoustic damping strip, by covering the intervals between windings.

According to a first embodiment, said filaments are wound on the porous layer, so as to be sandwiched between this latter and the porous core, subsequently deposited, for example by winding of a honeycomb structure in the form of a strip.

The windings of the filaments are spaced from each other and only facing and overlapping the intervals between the strips of the porous layer.

According to another embodiment, said filaments are wound first on the mold so as to be located at least facing and overlapping the intervals between the strips of the porous layer which is wound subsequently and which will therefore be located as a sandwich between the structural layer formed by the filaments and the porous structure, identical for example to the preceding case.

Here again, the filaments are separated from each other and are not an obstacle to the accomplishment by the porous subjacent layer, of its dissipating function.

According to still another embodiment which is a compromise between the two preceding ones, said filaments are disposed on opposite sides of the porous layer but always so as to cover at least the intervals between strips of said porous layer.

According to a second embodiment of the process, said strip containing a thermoplastic, thermohardening or thermofusible material is a strip of perforated metal sheet clad with a film of glue and used for example with a porous layer constituted as in the example of the first embodiment of the process.

These strips of perforated metal sheet are deposited by winding according to various manners.

According to a first manner, the strips of perforated metal have a width equal to or less than that of the strips of the porous layer and are disposed in the first instance on the mold with an interval between two successive strips, then the porous layer is deposited in strips facing said intervals between strips of sheet metal.

According to a second embodiment, the strips of perforated metal have a width substantially greater than that of the strips of the porous layer and are disposed in the first instance on the mold with a slight partial overlapping between strips, then the porous layer is deposited such as for example to align each porous strip with a strip of sheet metal, the windings of the porous layer not touching each other.

According to a third embodiment, the strips of perforated metal have a width less than that of the strips of the porous layer, which is first deposited on the mold, such that the windings slightly overlap, then the strips of metal are disposed facing or not the regions of overlap of the strips of the porous layer, these strips not touching each other.

According to a third embodiment of the process, said strip containing a thermoplastic, thermohardening or thermofusible material is constituted in fact by the porous layer itself, which is formed from a cloth of filaments pre-impregnated with a thermohardening or thermoplastic resin. The filaments are thus selected with a diameter giving to the cloth or the like thus constituted, a high resistance to force coupled with a good acoustic dampening, the porous layer forming at the same time a structural layer.

In this third embodiment of the process, the single layer is wound on the mold so as to form strips or windings with a slight mutual overlap.

In all the examples given above, there are obtained panels which acoustic damping layer, which is necessarily turned toward the aerodynamic flow, is protected at the edges of the strips constituting said layer, because these edges are firmly secured on the one hand to a sublayer or an overlayer, according to the method of application, with a connection of the constituents of the layers by means of a suitable resin or glue.

Any peeling of the edges of the strips forming the acoustic damping layer by the aerodynamic flow is thus prevented and the mechanical properties as well as the strength over time of the panels, are substantially reinforced.

The invention also of course has for its object the acoustic damping panels obtained according to the above process, no matter what the context in which they are used.

BRIEF DESCRIPTION OF THE DRAWINGS

There will now be described in greater detail the embodiments mentioned above referring to the accompanying drawings, in which:

FIG. 3 is a fragmentary cross-sectional schematic view of an acoustic damping panel of the type used in the nacelle of the motor of FIG. 1, the cross-section being along the axis of the fan channel;

FIG. 4 shows schematically a first embodiment of the process of the invention;

FIG. 5 is a cross-section along the axis of air flow, of the acoustic damping layer of a panel according to the embodiment of FIG. 4;

FIG. 6 shows schematically a second embodiment of the process;

FIG. 7 is a cross-sectional view analogous to that of FIG. 5, and relative to the acoustic layer of a panel according to FIG. 6;

FIG. 16 shows schematically a seventh embodiment of the process;

FIG. 17 is a cross-sectional view analogous to that of FIG. 5 and relating to the acoustic layer of a panel according to FIG. 16;

FIG. 18 shows schematically an eighth embodiment of the process, and

FIG. 19 is a cross-sectional view analogous to that of FIG. 5 and relating to the acoustic layer of a panel according to FIG. 18.

DETAILED DESCRIPTION OF THE PREFERRED EMBODIMENTS

Figure 1:
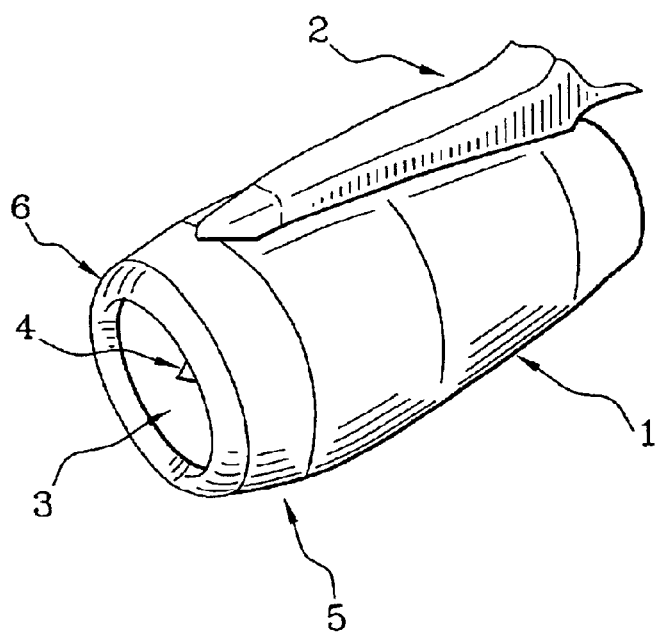
FIG. 1 is a schematic perspective view of an aircraft motor.

There is shown in FIG. 1 an aircraft turbo reactor comprising a nacelle 1 coaxially surrounding the motor properly so-called and fixed for example to a wing (not shown) of the aircraft by means of a mast designated generally by reference numeral 2.

The nacelle 1 has an annular cross-section and defines between itself and the central portion of the motor, an annular so-called fan channel 3. There is shown at 4 in the figure the nose in the form of a rounded cone of the fan driven by the motor and which is disposed at the inlet of the channel.

The front portion 5 of the nacelle 1 constitutes an air inlet structure which has particularly the function to ensure the aerodynamic flow of the air, on the one hand, toward the fan channel 3 and, on the other hand, toward the outside of the nacelle 1.

Figure 2:
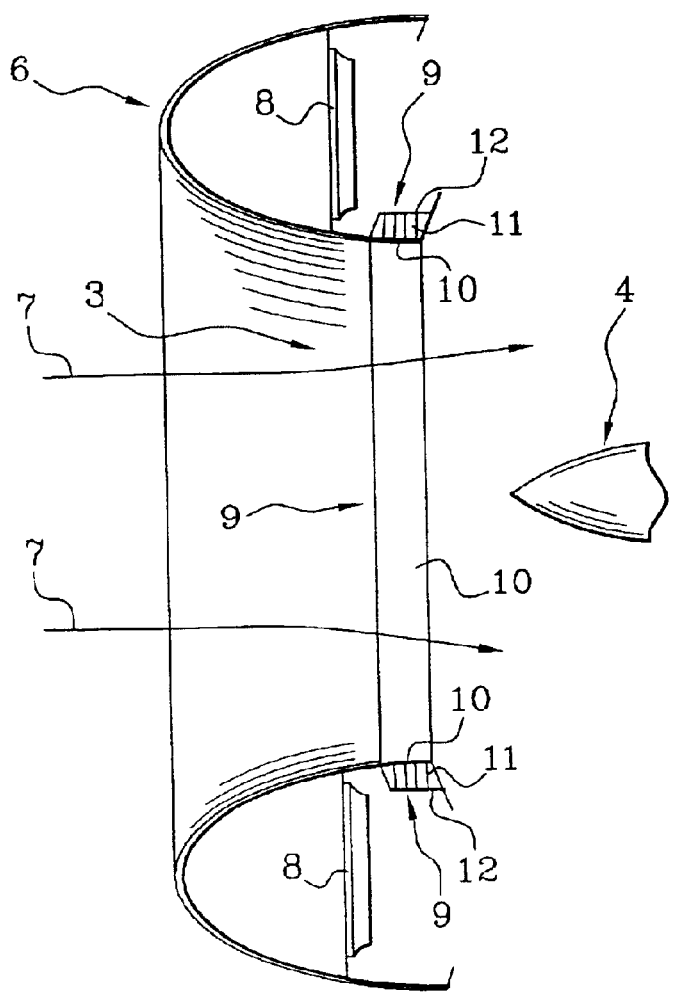
FIG. 2 is a fragmentary axial cross-section of the nose of the motor of FIG. 1.

As can be seen in FIG. 2, which is an axial cross-section of the nose of the nacelle 1, the air inlet structure is comprised conventionally of an air inlet lip 6 having a rearwardly opening U-shaped cross-section. This lip forms the external envelope of the front portion of the air inlet structure and ensures the division of the air between the portion 7 which enters the fan channel 3 and the portion which flows about the nacelle.

The air inlet structure comprises, in addition to the lip 6, a front reinforcing frame 8 and an acoustic attenuation panel 9.

This panel 9 has a generally annular shape and defines said fan channel with its internal surface 10 in contact with the aerodynamic flow 7. The panel has a structure adapted to attenuate noises produced by the central portion of the motor and particularly by the fan.

In practice, this structure is conventionally of the composite sandwich type and comprises, in addition to a porous acoustic damping layer constituting the surface 10, a porous core 11 such as a honeycomb and, opposite the porous layer 10, a layer 12 forming a total acoustic reflector.

The porous structure 11 can be simple, which is to say a single resonator or a multi-layer or even multiple porous core, which is to say with superposed resonators or with a porous core formed of several superposed layers separated or not by septa.

The process of the invention is applicable particularly to the production of acoustic damping panels such as the panel 9.

FIG. 3 shows the structure of a panel of this type made according to the teaching of FR 2 767 411 and constituted by a monobloc panel without joints and of a generally annular shape, comprising a central annular core comprising a porous central core 11, for example a honeycomb, covered, on the side of air flow 7, with an acoustic damping layer 10 deposited on winding or draping and, on the opposite side, a rear reflecting layer 12.

The acoustically resistive layer 10 is made for example from a porous structure available in strips and which is emplaced by winding helically on a mold (not shown) to the shapes and dimensions corresponding to those of the panel 9 to be produced.

The layer 10 is thus constituted of windings or successive strips 13 separated by a constant interval 14 and whose edges, particularly the attack edges 15, which is to say those exposed in the first instance to the aerodynamic flow 7, are substantially perpendicular to the axis of flow. This renders them fragile and risks giving rise to peeling of the strips 13 under the effect of the flow 7.

The invention seeks precisely to overcome these drawbacks.

According to a first embodiment of the process of the invention shown in FIGS. 4 and 5, after emplacement by winding on a mold indicated at M in FIG. 5, in appropriate shapes and sizes, the successive strips 13 spaced from each other by an interval 14 constituting the acoustic damping layer 10 of the panel, there is emplaced, also by winding, in line with the intervals 14, filaments forming narrow bands 16 by covering and slightly extending beyond said intervals 14.

These strips 16 thus cover the facing edges, hence the so-called attack edges 15, of the strips 13 of porous structure.

The damping layer 10 is for example a cloth formed by stainless steel grid or a cloth of carbon fibers or glass fibers pre-impregnated with an epoxy or thermoplastic resin.

By filaments constituting the strips 16, there is meant generally speaking an assembly of square, round or rectangular cross-section of filaments, strips of filaments, meshes, bundles or strands of filaments. These filaments can be of different types, such as carbon filaments, glass filaments or "Kevlar", coated with a suitable binder.

These filaments 16 are capable of transforming the dynamic and inertial forces, as well as those connected with the holding of the nacelle, toward the nacelle/motor structural connections.

The porous core (not shown), such as a honeycomb structure, is then emplaced from above the assembly 10–16, for example also by winding, the same as the final layer forming the reflector (not shown).

There is thus obtained an acoustic panel whose surface exposed to the aerodynamic flow 7 is formed from a layer with a double function: acoustic damping by the porous layer 10, and structural reinforcement by the strips of filaments 16.

The dissipating function of the layer 10 can take place in spite of the presence of filaments 16 which nevertheless leave, on the one hand, a large portion of the surface of the strips 13 free, which is to say uncovered, as can be seen in FIG. 5.

It is to be noted that in the region 17 of an edge of the band 13 subject to peeling because of the flow 7, any tearing off is prevented by the fact that this edge is secured to a portion of the sublayer (16) facing it, thanks to the resin of the filaments and if desired to the weave of the layer 10, which, by an ultimate thermal treatment, will diffuse and cover said edge, thereby ensuring the desired protection.

When all the elements of the panel are in place, the panel is unmolded by disassembly, retraction or melting of the mold on which have been wrapped the different elements. The consolidation of the edges of the strips 13 by heating is carried out preferably before demolding.

FIGS. 6 and 7 show a modified embodiment according to which the filaments 16 in the broad sense defined above, are emplaced on the other side of the porous strips 13, which is to say on the side of the aerodynamic flow 7, the filaments 16 being for this reason laid down first on the mold.

The filaments 16 are disposed as in FIG. 5, astride the intervals 14 between strips 13 and furthermore the supplemental filaments 16' are disposed substantially in the central region of the strips 13. This reinforces the structural function of the filaments 16 whilst nevertheless permitting the strips 13, in their portions uncovered by the filaments 16, to play their acoustic dissipation role.

Figure 8:
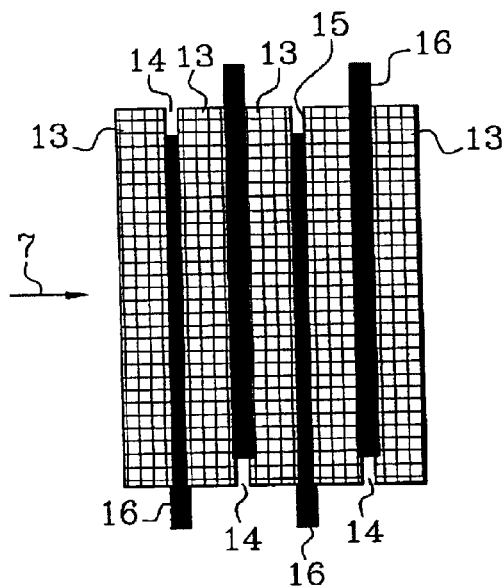
FIG. 8 shows schematically a third embodiment of the process.
Figure 9:
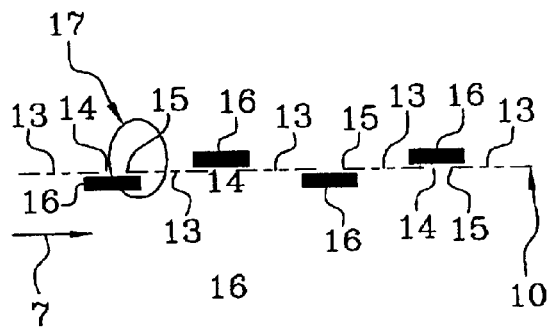
FIG. 9 is a cross-sectional view analogous to that of FIG. 5 and relating to the acoustic layer of a panel according to FIG. 8.

FIGS. 8 and 9 show another modification according to which the filaments 16 are emplaced alternately on opposite sides of the layer 10.

In these two modifications, there is obtained at 17 the same securement between the edges of the strips 13 and the portion of the sublayer or overlayer (16) facing it, thanks to the resin of the layer or layers in question, which will be subsequently heated.

In the case of FIGS. 8 and 9, the double acoustic/structural layer (10, 16) is made in three passes, namely a first application of filaments 16, an application of the layer 10, then a second application of filaments 16.

Figure 10:
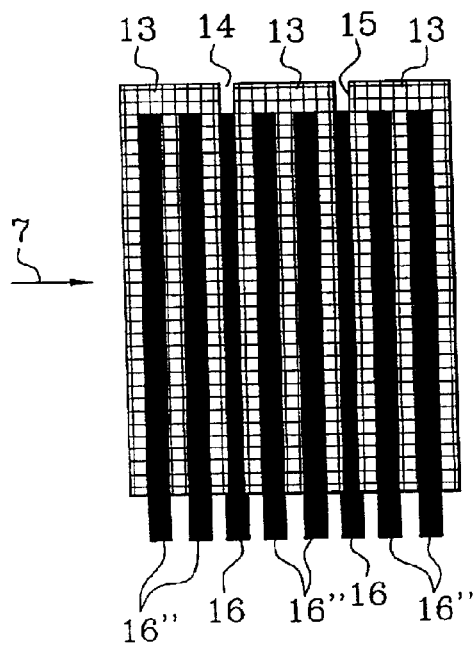
FIG. 10 shows schematically a fourth embodiment of the process.
Figure 11:
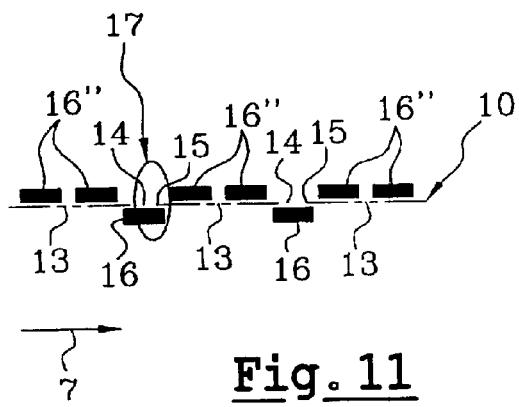
FIG. 11 is a cross-sectional view analogous to that of FIG. 5 and concerning the acoustic layer of a panel according to FIG. 10.

FIGS. 10 and 11 show another modification according to which the strips 13 of the dissipating layer 10 are substantially wider than the filaments 16 of the preceding examples. The filaments 16 are disposed on opposite sides of the layer 10, but the covering of the intervals 14 is ensured only by the filaments 16 deposited on the flow side 7, the filaments 16" on the other side serving only for structural reinforcement and covering only a portion of the strips 13.

The securement at 17 to the edges of the strips 13 is done as in the case of FIGS. 6 and 7.

The emplacement of the strips 13, 16, 16" takes place according to the same process as in FIGS. 8 and 9.

Figure 12:
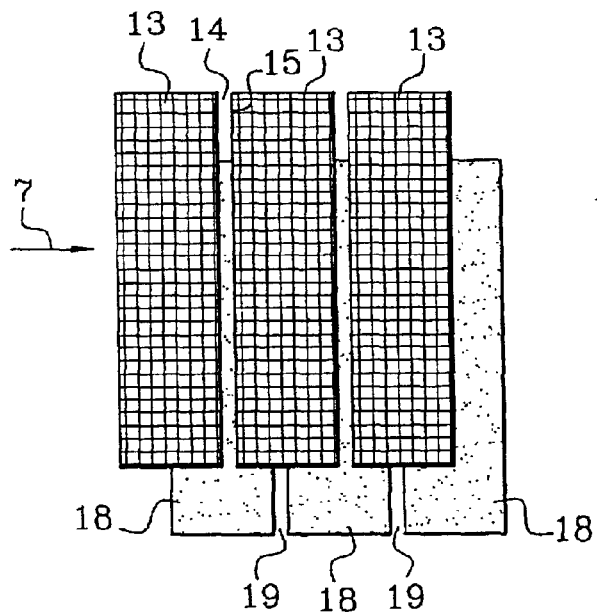
FIG. 12 shows schematically a fifth embodiment of the process.
Figure 13:
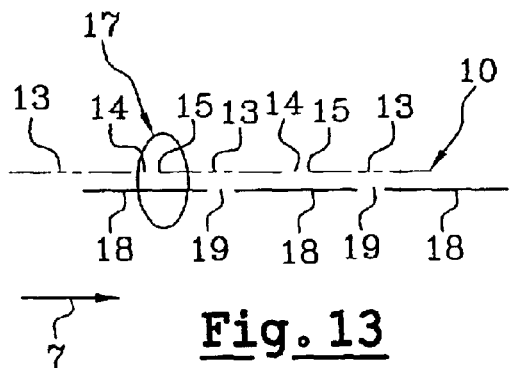
FIG. 13 is a cross-sectional view analogous to that of FIG. 5 and relating to the acoustic layer of a panel according to FIG. 12.

FIGS. 12 and 13 show another embodiment in which the acoustic layer 10 is analogous to that of the preceding examples, but the filaments (16, 16', 16") are replaced by strips 18 of perforated sheet metal from structure in the shape of a strip deposited by striping on the mold, before deposition of the porous strips 13.

The strips 18 are helically wound with an interval 19 between them so as to overlap the intervals 14 of the layer 10.

Thus, the layer 10 can play its acoustic role, however the strips 18 take part in reinforcing the structure of the panel.

To ensure at 17 the securement between the attack edge (15) of each strip 13 with its facing portion of sheet metal 18, there are used various means according to the nature of the layers 10 and 18.

The layer 10 can be a metallic cloth or a cloth of fibers pre-impregnated with an epoxy or thermoplastic resin.

The sheet metal of the strips 18 is a metallic sheet, of aluminum, titanium or other material for example, or sheet metal of composite material constituted for example by a cloth of fibers pre-impregnated with a thermosetting or thermoplastic resin.

If the two layers (10, 18) are cloths of fibers pre-impregnated with resin, the soliderization such as at 17 of the edges of the strips 13 with the facing metal sheets 18 takes place by ultimate heating of the resin as above.

If the sheet 18 is metallic, the securement at 17 will take place either with the help of the resin of the layer 10, of with the help of this latter and a thermofusible glue previously deposited on said metallic sheet, or with the help of this glue alone if the layer 10 is a metallic cloth.

Figure 14:
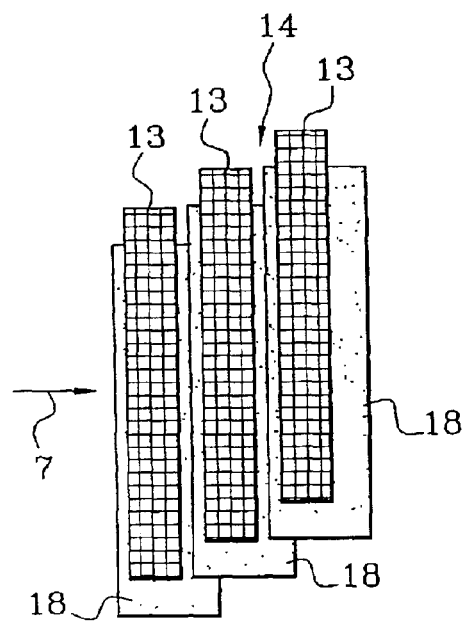
FIG. 14 shows schematically a sixth embodiment of the process.
Figure 15:
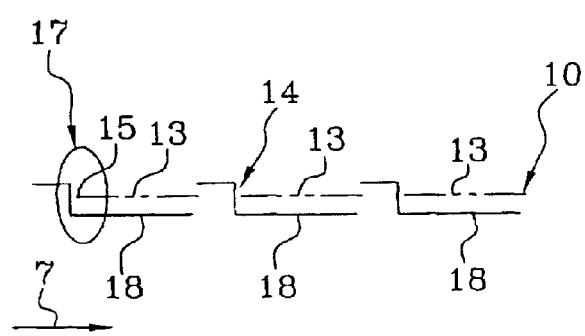
FIG. 15 is a cross-sectional view analogous to that of FIG. 5 and relating to the acoustic layer of a panel according to FIG. 14.

FIGS. 14 and 15 show a modification of the process according to FIGS. 12 and 13, in which the strips of sheet metal 18 are disposed slightly mutually overlapping, thereby ensuring a total covering of the subjacent strips 13 which themselves have a width substantially less and are disposed facing the central region of the sheets 18, with a large interval 14 between the strips 13 facing the region of overlap of the metal sheets 18.

The acoustic damping layer 10 plays, thanks to the holes of the sheet metal 18, its acoustic role, however the sheet metal 18 plays its structural role and the edges of the strips 13 are, as at 17, perfectly plastered against the porous core (not shown) thanks to the resin and if desired to the glue of the sheet metal 18, heated subsequently as in the preceding example.

FIGS. 16 and 17 show two modifications of the preceding example, consisting in reversal of the mutual positions of the respective porous layer 10 and metallic layer 18.

In variation A, the arrangement is identical to that in FIGS. 14 and 15 and merely reversed, the strips 13 of porous structure being slightly mutually overlapping, the attack edges 15 not being in contact with the aerodynamic flow 7.

The securement of the parts by covering the strips 13 is ensured only by the resin of the cloth of the strips, which is ultimately heated.

In modification B, the arrangement is similar to that of modification A except that the sheet metal 18 is wider and is placed astride the regions of overlap of the porous strips 13, thereby reinforcing the region of the edges of the strips 13.

Finally, FIGS. 18 and 19 show still another embodiment in which the acoustic damping and structural functions are ensured by a single layer (10') formed of strips 13' that slightly mutually overlap.

The strips 13' are disposed by striping with a strip material constituted by a cloth formed of strands or filaments of sufficient diameter to give to the cloth good resistance to forces coupled with a high acoustic damping. The cloth is for example constituted by carbon fibers, glass fibers or "Kevlar" fibers, pre-impregnated with a thermosetting or thermoplastic resin which will ensure by heating the adherence of the regions of cloth covering the strips 13', thereby protecting the attack edges 15 which are themselves covered by the adjacent strip 13'.

In the various embodiments described above, the thicknesses of the layers of materials used are small, even in the case of partial overlying of the layers, not giving rise to aerodynamic impediments, causes of aerodynamic turbulence. Thus, the aerodynamic and acoustic homogeneity is complete over all the internal wall of the final annular panel.

It is to be noted that the structural layer (filaments 16, 16', 16"; metal sheets 18) can be deposited by draping.

In all cases in which the structural layer is deposited, as the acoustic damping layer, by striping, it is important to synchronize the depositions of these layers such that the edges of the acoustic layers will be protected by a strip of structural layer. The adjustable interval of deposition of the structural layer permits controlling the quantity of open surface of the acoustic damping layer.

Finally, the invention is clearly not limited to the embodiments shown and described above, but on the contrary covers all modifications, particularly as to the nature of the acoustic damping layer, the nature of the structural layer and the manner of emplacement of the filaments or strips of the structural layer relative to the strips of acoustic damping layer, as well as the order of emplacement of the different constitutent layers of the panel.

Thus in the case of non-annular panels, concave or convex, the process of the invention permits simultaneous production of several panels from a same mold on which are striped or draped the various layers, namely the porous layer such as 10, the structural layer such as 16 associated with the porous layer 10, the porous layer 11 and the layer 12 forming a total reflector, the order of successive deposition of the layers on the mold permitting obtaining panels with a concave or convex protected porous layer according to the envisaged uses. These panels can comprise flat or complex portions. There can thus be produced for example panels constituting doors of pressure reversers.

According to a modification, it is also possible to produce a panel in two stages by beginning to stripe or drape on a mold the total reflector 12, then the porous core structure 11, then, in a second stage, and after baking in an autoclave and withdrawal of the mold, striping or draping the porous layer 10 and the pre-impregnated filaments 16 on the core with a porous structure 11 according to the process of the invention.

Moreover, in the embodiments shown in FIGS. 4 to 11, the structural strength of the panel can be increased by depositing, by striping or winding, filaments 16, 16', 16" that are supplementary and form an angle more than zero with the other filaments 16, 16', 16", these supplemental filaments being disposed on opposite sides or not, of the porous layer 10.

What is claimed is:

1. Process for the production of a panel with a protected acoustic damping layer, comprising the steps of:
   emplacing a porous core between a total acoustic reflector and at least a porous acoustic damping layer;
   emplacing said porous acoustic damping layer by striping or draping, in order to obtain parallel strips that are distant from adjacent ones of said parallel strips;
   emplacing only astride intervals between said parallel strips, filaments pre-impregnated with a thermosetting or thermoplastic material; and
   heating said thermosetting or thermoplastic material in order to ensure the securement of edges of said parallel strips with said filaments.

2. Process according to claim 1, for the production of a single piece panel, without a joint, of generally annular shape, wherein said porous layer and said strip containing a thermoplastic, thermosetting or thermofusible material, are striped or draped on a mold having the shape of the panel to be obtained.

3. Process according to claim 1, wherein said filaments are striped on said porous layer, so as to be sandwiched between said porous layer and a porous core which is subsequently deposited by striping a honeycomb structure in the form of a strip.

4. Process according to claim 3, wherein windings of the filaments are separated from each other and only facing and overlapping intervals between the parallel strips of the porous layer.

5. Process according to claim 1, wherein said filaments are first emplaced by striping on a mold and are located at least facing and overlapping intervals between the parallel strips of the porous layer which are subsequently emplaced by striping.

6. Process according to claim 1, wherein said filaments are disposed on opposite sides of the porous layer so as to at least cover intervals between the parallel strips of said porous layer.

7. Process according to claim 1, wherein filaments are in the form of an assembly of square, round or rectangular cross-section comprised of filaments, strips of filaments, meshes, strands or braids of filaments.

8. Process according to claim 1, wherein, to increase the structural strength of the panel, there is deposited, by striping or winding, supplemental filaments forming an angle greater than zero with said filaments and disposed on opposite sides or on either side of the porous layer.

9. Process for the production of a panel with a protected acoustic damping layer, comprising the step of:
   emplacing at least a porous core between a total acoustic reflector and a porous acoustic damping layer;
   emplacing said porous layer by striping or draping in order to obtain parallel strips distant one from adjacent ones of said parallel strips;
   emplacing only astride intervals between said parallel strips, strips of a perforated sheet selected from the group comprising metallic sheets and sheets of composite material constituted of a cloth of fibers pre-impregnated with a thermosetting or a thermoplastic material; and
   heating said thermosetting or thermoplastic material in order to ensure the securement of edges of said parallel strips with said strips of perforated sheet.

10. Process according to claim 9, said perforated sheet is coated with a thermofusible glue.

11. Process according to claim 9, wherein the strips of perforated sheet have a width substantially greater than that of the parallel strips of the porous layer and are first deposited on the mold with a slight partial overlap between strips, then the porous layer is deposited so as particularly to align each parallel strip with a sheet strip, the windings of said porous layer not touching each other.

12. Process according to claim 9, wherein the strips of said perforated sheet have a width less than that of the parallel strips of the porous layer which is first deposited on the mold, such that the windings overlap slightly, then the strips of said perforated sheet are placed facing or not the regions of overlap of the parallel strips of the porous layer, said parallel strips not touching each other.

13. A process according to claim 9, wherein said strips of perforated sheet are metallic sheets covered with a thermofusible glue.

14. Process for the production of a panel with a protected acoustic damping layer comprising the steps of:
   emplacing at least a porous core between a total acoustic reflector and a porous acoustic damping layer;
   emplacing said porous layer by striping or draping a cloth of filaments pre-impregnated with a thermosetting or a thermoplastic material, said cloth being deposited so as to form strips or windings with a slight mutual overlap; and
   heating said thermoplastic or thermosetting material in order to ensure the securement of edges of said strips.

15. Process for the production of a panel with a protected acoustic damping layer comprising the steps of:
   emplacing at least a porous core between a total acoustic reflector and a porous acoustic damping layer;

striping or draping on a mold said total reflector, then said porous core, then, after baking in an autoclave and withdrawal from the mold, striping or draping said porous layer in order to obtain parallel strips;

striping or draping filaments pre-impregnated with a thermosetting or a thermoplastic material; and heating said thermosetting or thermoplastic material in order to ensure the securement of edges of said parallel strips with said filaments.

16. A process for the production of a panel with a protected acoustic damping layer comprising the steps of:

emplacing at least a porous core between a total acoustic reflector and a porous acoustic damping layer, said step of emplacing said porous acoustic damping layer comprises in emplacing said porous acoustic damping layer by striping or draping in order to obtain parallel strips distant one from adjacent ones of said parallel strips;

emplacing only astride intervals between said parallel strips, strips of a perforated sheet;

securing edges of said parallel strips with said strips of perforated sheet.

17. A process according to claim 16, wherein said strips of perforated sheet are metallic sheets covered with a thermofusible glue.

* * * * *